July 18, 1933. K. EISENZAPF 1,919,015
METHOD OF DETERMINING DISTANCES
Filed Jan. 17, 1930
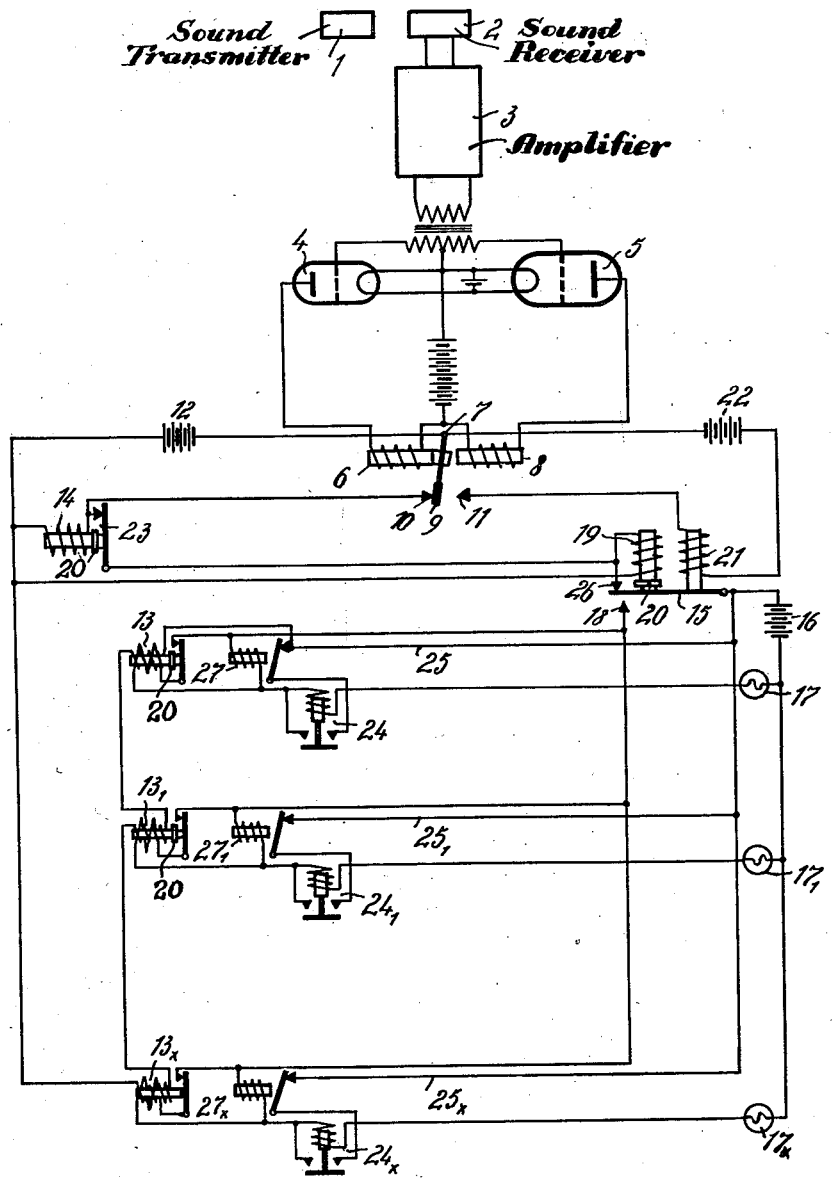

Patented July 18, 1933

1,919,015

UNITED STATES PATENT OFFICE

KARL EISENZAPF, OF BERLIN-WILMERSDORF, GERMANY, ASSIGNOR TO SIEMENS & HALSKE, AKTIENGESELLSCHAFT, OF SIEMENSSTADT NEAR BERLIN, GERMANY, A CORPORATION OF GERMANY

METHOD OF DETERMINING DISTANCES

Application filed January 17, 1930, Serial No. 421,443, and in Germany January 17, 1929.

My invention relates to improvements in the method of determining distances by means of sound waves.

In determining distances by the aid of sound waves in gases or liquids the time is ascertained which the sound requires to traverse the distance to be measured or in echo sounding respectively for traversing double the distance to be measured. For determining the time of traversal of the sound, apparatus is generally used which indicates the time in a mechanical manner.

According to my invention the time which the sound requires is determined in an electric or magnetic manner, and as measure for the time is employed the change of a magnetic or electric value taking place according to known laws. In a preferred method of carrying out my invention, apparatus for changing an electric or magnetic value is rendered operative when dispatching the sound traversing the distance to be measured, and on arrival of the sound or the echo respectively it indicates the change which has taken place meanwhile.

Assuming as a matter of general principle, a source of gradually diminishing potential being applied to a number of electromagnetic relays when the sound is dispatched, and that all relays have then attracted their armatures. As soon as the sound has been dispatched the armatures of the individual relays drop off in succession according to the drop of voltage of this source. The relays must be so designed that the armature of the last relay drops off only when the sound has already traversed the longest distance to be measured. In determining sea depths this distance will generally amount to 7500 m at the outside.

When the sound arrives after traversing the distance to be measured, there will usually be a number of relays the armatures of which have not dropped off yet. The number of such relays is a measure for the time which the sound has required to traverse the distance to be measured. The number of the armatures which have not dropped off yet is therefore preferably made visible on arrival of the sound, for instance the echo. It is, of course, essential that the train of waves dispatched traverses the distance to be measured and that on arrival of the sound it is indicated which of the relays have already responded or which have not yet become operative.

Preferably a number of time lag relays are used the tripping times of which are set differently. If on dispatching the sound the energizing circuit of all the relays is broken the armatures of these relays drop off in succession. If on arrival of the sound after traversal of the distance to be measured the number of the already dropped off relays is made visible the length of the distance traversed may be determined thereby.

An embodiment of my invention adapted for echo sounding is diagrammatically illustrated in the drawing affixed to my specification. In this figure 1 is a transmitter of the sounding type which may dispatch signals at intervals of about 10 seconds. 2 is a receiver for the reception of the echo, 3 an amplifier. The sound waves received and converted into electric currents by the receiver 2 in well known manner are passed to the vacuum or electron tubes 4 and 5. In the anode circuit of the tube 4 is connected the coil 6 of the relay 7, in the anode circuit of the tube 5 the coil 8 of this relay. The armature 9 of the relay cooperates with the contact 10 or 11 according to whether the coil 6 or 8 has been energized. The tubes 4 and 5 are according to my invention so dimensioned that the tube 5 has a low degree of amplification but is capable of a considerable output, while the tube 4 has a high degree of amplification, but is capable of only a small output. If sound waves of great intensity strike the receiver 2 the tube 4 is over-modulated and its output remains small, while tube 5 is powerfully energized and supplies a large output, which greatly preponderates over the output of tube 4. The consequence is that the coil 8 is more strongly energized than the coil 6. The armature 9 is therefore pulled against the contact 11. If, on the other hand, sound waves of lesser intensity strike the receiver 2 the coil 6 is more strongly energized because the coil 8 receives little current only on account of the lower degree of amplification of the tube 5. When dispatching the sound by the aid of the transmitter 1 sound waves of high intensity strike the receiver 2 first directly so that the armature 9 of the relay 7 is pulled against the contact 11. As soon as the arriving sound (for instance the echo) traversing the distance to be measured strikes the receiver 2, this receiver is only weakly energized and for the reasons stated above the armature 9 of the relay 7 is pulled against the contact 10.

The armature 9 of the relay 7 thus moves against the contact 11 when the sound is dispatched and on the arrival of the echo it moves against the contact 10. The contact 10 is connected in the circuit of the battery 12 and controls the series connected exciter windings of the time relays 13 to $13_x$ across the armature contacts 23 and 26 of the relays 14 and 15 to be more fully described later on. As time relays 13 to $13_x$, time relays frequently employed in automatic telephony may be used. When contact 10 of relay 7 is closed, which is for instance the case prior to the dispatch of the sound through transmitter 1, relay coils 14 and 19 connected in parallel to battery 12 are energized. Coil 14 is directly energized, and coil 19 indirectly through the closing of armature contact 23 of relay 14, when the latter is energized. Thus the armature of relay 15 is attracted and closes its contact 26, so that in addition, prior to the sound dispatch, also the time relays 13 to $13_x$ are energized and their respective armatures are attracted. The energizing circuit for coil 19 runs from battery 12 over contacts 10, 23, coil 19, battery 12. The energizing circuit for relays 13 . . . $13_x$ closed by contact 26, runs from battery 12 over closed contacts 10, 23, 26, armature of relay 15, line 25, in series through small coils of relays 13 . . . $13_x$, back to battery 12. If a train of waves is now sent out by the sound transmitter, the direct, strong reception thereof by receiver 2 energizes tube 5 as aforedescribed, the contact 10 is opened and the energizing circuit of the relays 13 to $13_x$ interrupted thereby. The armatures of the relays now drop off in succession in accordance with their respective time constants.

In the circuit controlled by the armatures of the time relays 13 to $13_x$ are connected the battery 16, the lamps 17 to $17_x$, as well as the contact 18 controlled by relay 15. So long as the contact 10 of the relay 7 is closed coil 19 of relay 15 attracts its armature as described and thus keeps the contact 18 open. In order to prevent that during the changing-over of the relay 7 from the contact 10 to the contact 11 the contact 18 is closed, the relay winding 19 connected in the circuit of the contact 10 as well as the relays 13 to $13_x$ are provided with a short-circuiting ring 20 which imparts to the relay such a time lag that it does not trip during the changing over of the relay 7 from the contact 10 to the contact 11. As soon as the contact 11 is closed the dropping off of the armature of relay 15 is prevented by the additional relay winding 21 which is now energized from battery 22 by way of closed contact 11.

After the sound has been dispatched by the transmitter 1 and the contact 10 has opened the relay 14, likewise designed as time relay releases its armature and thus opens the contact 23. If now the echo reaches the receiver 2 the contact 11 of the relay 7 is opened and the contact 10 closed for the reasons described before. When the contact 11 is opened coil 21 of relay 15 releases its armature, which now closes contact 18 and establishes a circuit through the lamps 17 to $17_x$ and through the armature contacts of relays 13 to $13_x$. As far as the armatures of these relays have not fallen off (due to their longer timing) the respective lamps will therefore light up. In order that the lamps should not be extinguished again when the contact 18 opens through re-energization of coil 19, there are connected in the parallel circuits of these lamps the relays 24 to $24_x$ respectively which are equipped with holding contacts in well known manner. As soon as the lamp circuit carries current the armature of the respective relays 24 to $24_x$ is attracted and closes the holding circuit across the respective lines 25 to $25_x$. For instance such a holding circuit includes for lamp 17 the battery 16, line 25, open armature of relay 27, holding contact of relay 24, coil of relay 24, lamp 17, back to battery 16. For the other lamps similar circuits can be traced.

Since on arrival of the echo the contact 10 is closed again the time relay 14 is energized. After the lapse of a certain time it attracts its armature and thus closes the contact 23. Coil 19 of relay 15 is thus again energized and attracts its armature. The contact 18 is thus opened. Simultaneously the contact 26 which controls the energizing circuit of the time relays 13 to $13_x$ is closed. In this way the exciter windings of these relays receive current and attract their armatures in the manner aforedescribed. This has, however, no effect upon the lamp circuits because the contact 18 is already open, and, therefore, only the lamps circuits, previously closed in the manner described, remain closed by the hold-over relays 24 . . . $24_x$.

In order that during the next sounding, in which, for instance, a further relay may drop off, its pertaining lamp is also switched off, relays 27 to $27_x$ are connected respectively in parallel to the contacts of the relays 13 to $13_x$. The respective contacts controlled by relays 27 to $27_x$ are connected in the respective holding circuits 25 to $25_x$. The energizing windings of relays 27 to $27_x$ are so designed that, so long as the large auxiliary winding of the pertaining relays 13 to $13_x$ remains connected in parallel, the current flowing through relays 27 to $27_x$ does not suffice to bring about the opening of the respective holding circuits 25 to $25_x$. But, if, for instance on arrival of the echo and on closing of contact 18 by relay 15, the armatures of relays 13 and $13_1$ have already dropped off, their armature contacts are open, and now the coils of relays 27 to $27_1$ are sufficiently energized to attract their respective armatures and to open the contact connected respectively in the holding circuit 25 and $25_1$. In this way the circuit of the lamps 17 and $17_1$ is interrupted and the holding relays 24 and $24_1$ likewise open their contacts. In order that the remaining relays $13_2$ to $13_x$ should not drop off after arrival of the echo and the respective lamps should not be extinguished, the aforementioned auxiliary winding, indicated by large turns, is provided which winding is connected in the circuit controlled by the pertaining armature of each relay. These windings thus act in the manner of holding windings, because as soon as the contact 18 is closed on arrival of the echo, the aforementioned auxiliary windings of those relays are energized, whose armatures have not yet dropped off. These windings remain energized until the contact 18 of relay 15 is opened. When this happens however, the small turn windings of relays 13 to $13_x$ are immediately re-energized, so that no changes occur in the respective lamp circuits, and the pertaining lamps of those of relays 13 to $13_x$ remain lighted, whose armatures had not dropped off during the travelling time of the signal.

When taking soundings the parts of the system described function in the following sequence: prior to the dispatch of the sound from the transmitter 1, i. e. in the operative state of the system, the contact 10 of the relay 7 is closed and the coils of the relays 13 to $13_x$ receive current from the battery 12 across the contact 10, the contact 23 and the contact 26. It may be assumed that the armatures of the holding relays 24 to $24_x$ have dropped off as shown and the lamps 17 to $17_x$ have been extinguished. The energizing winding of the relay 14 as well as the energizing winding 19 of the relay 15 likewise receive current across the contact 10. If a sound is now dispatched the contact 10 is opened and the contact 11 closed for the reasons explained before. The small diameter windings of relays 13 to $13_x$ are thus de-energized. The energizing winding 21 of the relay 15 receives now current from the battery 22 across the contact 11 and holds its armature attracted. During the moment of switching by relay 7 from contact 10 to 11 the armature of relay 15 is held attracted by the short-circuiting winding 20.

Meanwhile the train of waves dispatched traverses the distance to be measured and the armatures of the relays 13 to $13_x$ drop off in succession according to their predetermined time lags. The time relay 14 also opens the contact 23 after a certain time. If now the echo reaches the receiver 2 the contact 11 is opened and the contact 10 closed again. The circuit through the small diameter winding of relays 13 to $13_x$, however, remains broken still for some time at the contact 23 which is only closed again after the lapse of a suitable time determined by lag of the time relay 14. In the meantime, when the echo arrives, the circuit through the energizing winding 21 of relay 15 is broken since at that time contact 11 is open. The relay releases the armature and thus closes the contact 18. In this way those of lamps 17 to $17_x$ are lighted from battery 16, whose pertaining relays 13 to $13_x$ have not dropped their armatures by the time the signal arrives. Only after completion of the switching movement initiated by the aforementioned closing of contact 18, relay 14 closes its contact 23 and coil 19 thus receives current. The armature of relay 15 is thus raised, opens the contact 18 and closes the contact 26 so that now the small energizing windings of relays 13 to $13_x$ receive current again. The lamps switched in already continue however to burn because their respective holding relays 24 to $24_x$ close the auxiliary circuit through battery 16.

It may be assumed that during the first measurement only the relay 13 has dropped its armature.

The second measurement after a period of, say, 10 seconds takes place in the same way. During this measurement however, it may happen that in addition relay $13_1$ releases its armature prior to the arrival of the echo, When the echo now arrives and the contact 18 is closed the winding $27_1$ receives sufficient current because it is no longer in shunt with the large auxiliary winding of relay $13_1$, since the armature of the latter has opened its contact. Coil $27_1$ attracts its armature and thus opens the holding circuit belonging to the lamp $17_1$.

It will be readily understood that the connections may be modified in various ways without departing from the spirit of my invention or the ambit of the appended claims. The tubes 4 and 5 may thus be replaced by relays or the like. For measuring the time, relays may also be employed which in succession switch themselves in or out. The design of the time relays is likewise immaterial for my invention. Means might, for instance, be provided for setting different time lags. All these are expedients well known in this art.

The time lags of the relays are preferably stepped logarithmically in order to obtain substantially the same percentage measuring accuracy at various depths.

A special advantage of my improved method resides in the fact that the measuring accuracy is independent of the interval between the dispatch of the signal by the transmitter 1. Generally it will suffice to carry out the soundings at intervals of 10 seconds.

I claim as my invention:

1. In an arrangement for measuring distance by means of sound waves, a plurality of time lag relays, and means for timing said relays with respect to one another to respond with their armatures successively to a common simultaneously exerted control action, a sound transmitter, a sound receiver, means for exerting the control action on all of said relays simultaneously at the time of dispatching the sound signal, and means controlled by the signal arriving at the receiver after traversing the distance to be measured, for maintaining an indication of the relays which have responded with their armatures during the travelling time of the signal over said distance.

2. In an arrangement for measuring distance by means of sound waves, a plurality of time lag relays, each having an exciter winding and a short circuit winding and means for energizing all of said exciter windings simultaneously when dispatching the sound signal, said short circuited windings being differently dimensioned in said several relays to cause their respective armatures to successively drop one after the other when the excitation of all relays is simultaneously interrupted, a sound transmitter, a sound receiver, means responsive to the transmitted signal arriving directly at the receiver for simultaneously interrupting the excitation of all of said relays, and means controlled by the signal arriving at the receiver after traversing the distance to be measured for maintaining an indication of the relays whose armatures have dropped during the travelling time of the signal.

3. In an arrangement for measuring distance by means of sound waves, a plurality of time lag relays, each having an exciter winding and a short circuit winding and means for energizing all of said exciter windings simultaneously when dispatching the sound signals, said short circuited windings being differently dimensioned in said several relays to cause their respective armatures to successively drop one after the other when the excitation of all relays is simultaneously interrupted, a sound transmitter, a sound receiver, means responsive to the transmitted signal arriving directly at the receiver, for simultaneously interrupting the excitation of all of said time lag relays, means responsive to the signal arriving indirectly at the receiver by way of the distance to be measured, for restoring the excitation of said relays when the indirect signal has arrived, holding relays and their energizing circuits closed by the respective attracted armatures of said time lag relays, and an indicating circuit and means controlled by said holding relays for maintaining an indication through said circuit of the time lag relays whose armatures have not dropped during the travelling time of the signal, and an auxiliary relay for each time lag relay, having an energizing circuit controlled by the armature of its pertaining time lag relay, and having in turn an armature for controlling the energizing circuit of the pertaining holding relay to interrupt its indicating circuit, if the pertaining time lag relay should drop its armature during the travelling time of a subsequently transmitted signal over the distance to be measured.

KARL EISENZAPF.